Figure 1:
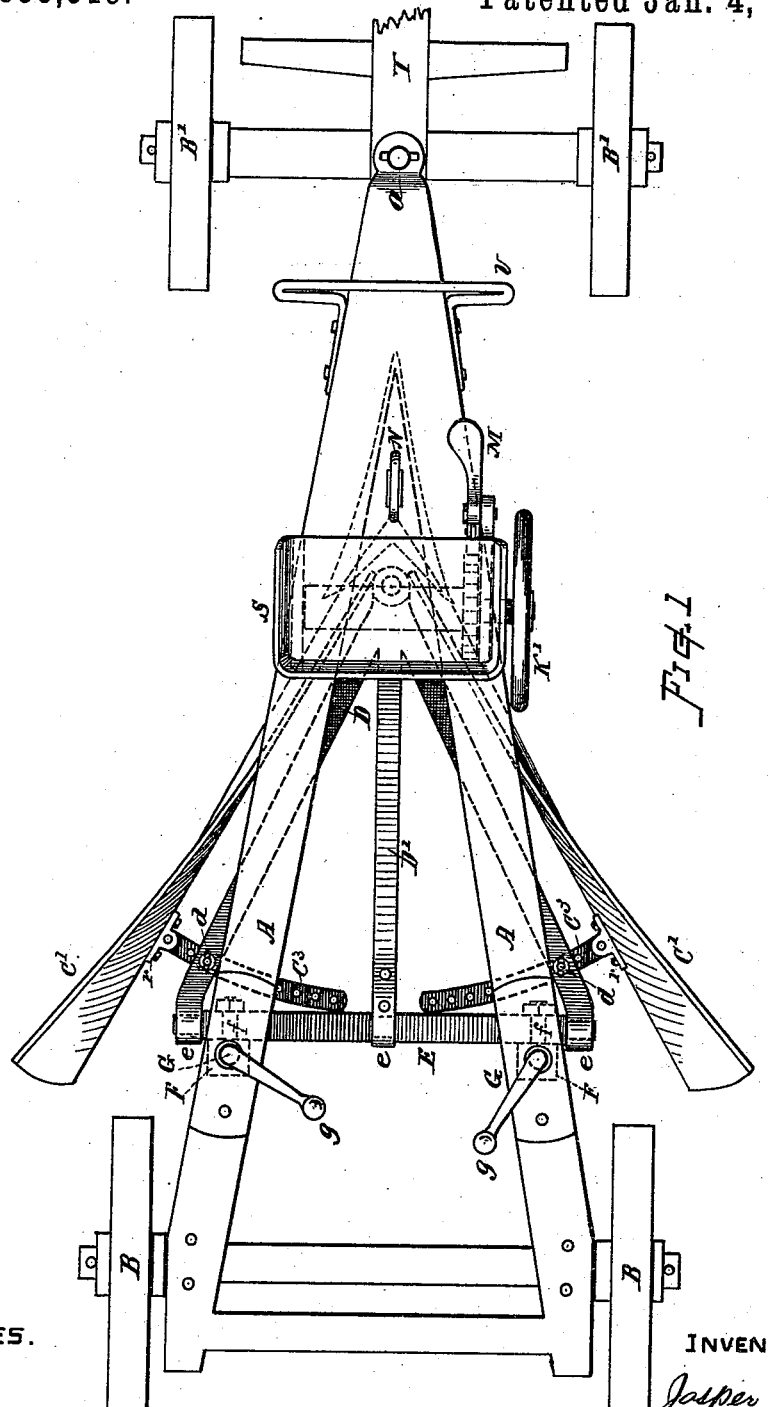

(No Model.) 3 Sheets—Sheet 1.

J. FAY.
MACHINE FOR CLEARING AND WORKING ROADS.

No. 355,519. Patented Jan. 4, 1887.

WITNESSES.
Ella P. Blenus
H. P. Baston

INVENTOR
Jasper Fay
by Chas. H. Burleigh
Attorney (No Model.) 3 Sheets—Sheet 2.
J. FAY.
MACHINE FOR CLEARING AND WORKING ROADS.
No. 355,519. Patented Jan. 4, 1887.
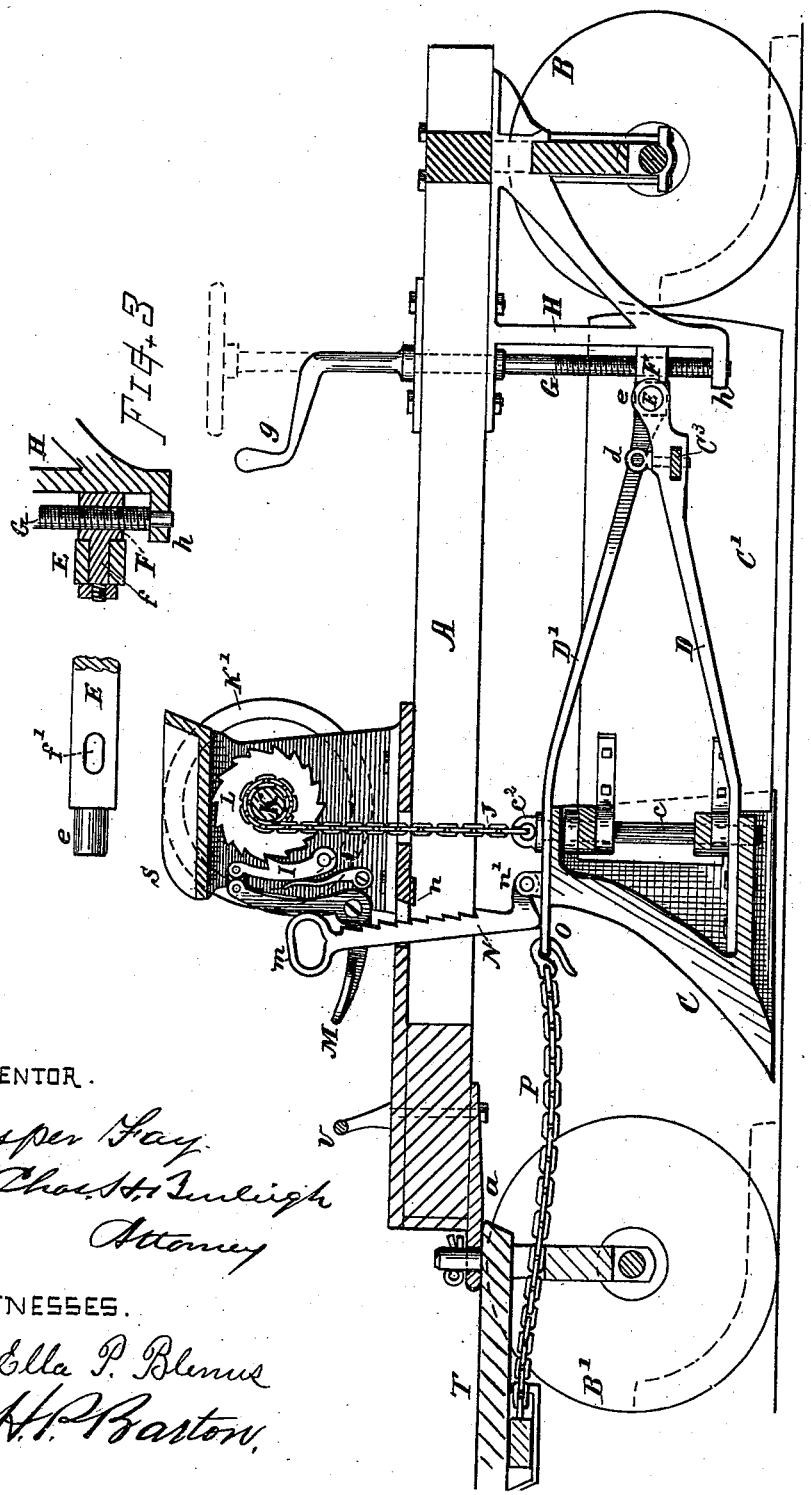

(No Model.) 3 Sheets—Sheet 3.
J. FAY.
MACHINE FOR CLEARING AND WORKING ROADS.
No. 355,519. Patented Jan. 4, 1887.
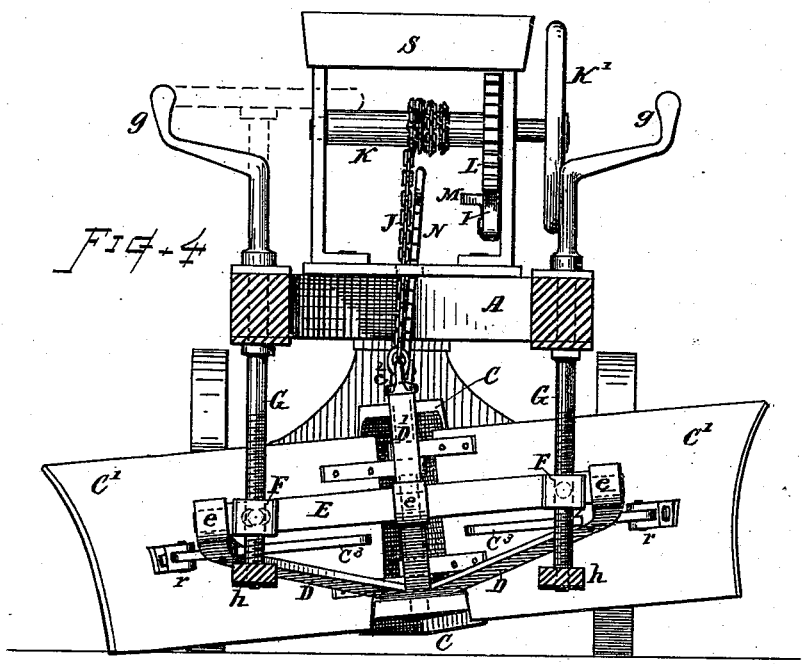
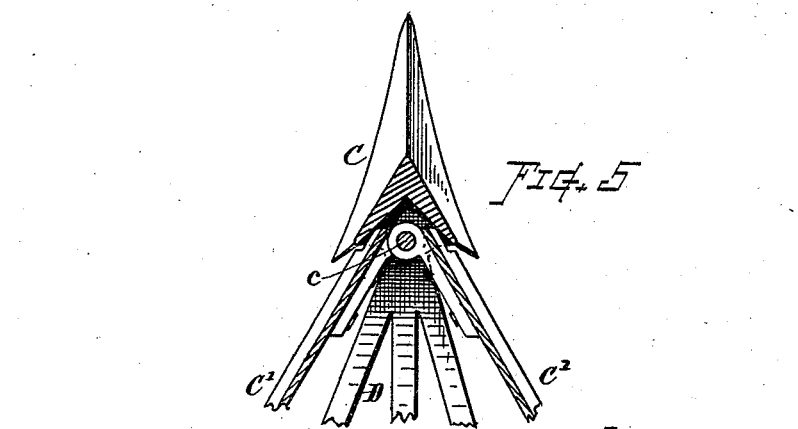
WITNESSES.
Ella P. Blenus
H. P. Barton
INVENTOR
Josper Fay
By Chas. H. Burleigh
Attorney

UNITED STATES PATENT OFFICE.

JASPER FAY, OF WESTBOROUGH, MASSACHUSETTS.

MACHINE FOR CLEARING AND WORKING ROADS.

SPECIFICATION forming part of Letters Patent No. 355,519, dated January 4, 1887.

Application filed July 8, 1886. Serial No. 207,494. (No model.)

*To all whom it may concern:*

Be it known that I, JASPER FAY, a citizen of the United States, residing at Westborough, in the county of Worcester and State of Massachusetts, have invented certain new and useful Improvements in Machines for Clearing or Working Roads, of which the following, together with the accompanying drawings, is a specification sufficiently full, clear, and exact to enable persons skilled in the art to which this invention appertains to make and use the same.

The object of my present invention is to provide a practical and convenient plow or machine for clearing or working roads, in which the plow or blade is suspended on a suitable carriage or frame mounted on trucks or runners and provided with mechanism whereby the plowing blade or scraper can be adjusted to various positions for successfully accomplishing the work to be performed; also, to afford means for elevating the forward end of the plow under convenient control of the operator; also, to provide facilities to be brought into use, when desired, for holding the forward part of the plow or scraper depressed; also, to provide, in connection with the sides of the push-frame, adjusting devices whereby either side of said frame, together with the blade, can be elevated or depressed independent of the other, as hereinafter explained. These objects I attain by mechanism the nature, construction, and operation of which are illustrated in the drawings and explained in the following description, the particular subject-matter claimed being hereinafter definitely specified.

In the drawings, Figure 1 is a plan view of a road plow or machine illustrating the features of my invention. Fig. 2 is a vertical sectional view of the same. Fig. 3 is a vertical section through the joint which connects the side elevating devices with the push-frame. Fig. 4 is a transverse vertical section in the rear of the side elevating mechanism, looking toward the front of the machine. Fig. 5 is a horizontal section through the point and hinging of the blades.

In reference to parts, A denotes the carriage body or frame, the rear portion of which is mounted either upon traveling wheels B or suitable runners, as desired, while the forward end of said frame is provided with an eye-plate, *a*, whereby it can be connected with an ordinary cart or sled axle and tongue, or mounted on an axle, B', having wheels or runners especially designed to accompany the machine, as in Fig. 2.

Suspended beneath the frame is a plow-point, C, having adjustable wings or scrapers C' connected therewith, which extend outward and backward therefrom in the manner shown.

The plow or point C is braced from the rear part of the machine by a triangular push-frame, D, the front end of which is secured to the base of the point, while the rear end thereof is hinged at *e* to a cross-piece or transversely-disposed bar, E, supported by screw-threaded followers or nuts F, mounted on upright screw-shafts G, the lower ends of which are sustained in bearings *h* on brackets or braces H, fixed on the under side of the frame A, while the upper part of said shafts extend up through bearings on the side frames, A, and are furnished at their upper ends with handles or cranks *g*, by means of which said shafts can be turned for elevating or depressing the respective followers and the parts connected therewith, so that the followers F will support the respective ends of the bar E at different levels.

If preferred, hand-wheels can be employed in lieu of crank-handles on the elevating shafts or screws G, as indicated by dotted lines in Figs. 2 and 4. A brace-bar, D', extends from the bar E to the top of the plow C, as indicated.

The brackets H are rigidly attached to the side timbers of the frame A, so as to firmly support the lower end of the screw and push-frame against the strain brought thereon by the working of the blade or plow.

The nuts or followers F are swivel-connected to the bar E by studs or projections *f*, that extend through slots *f'*, (see Fig. 3,) or in other equivalent manner, so that said bar E can take a position inclined in relation thereto without cramping the joints.

The followers or nuts F abut against and slide upon the straight front surface of the brackets H when moved up and down by the action of the screw-threaded shaft G, while the bar E is held close against the fronts of said followers, so that the backward thrust or strain on the plow when the machine is moving and at work is transmitted to and borne by the brackets or braces H, which are rigid with the frame A, this being equally the case at whatever position or height of adjustment the followers may stand in relation to the foot of their adjusting-shafts.

The plow-point is made V-shaped, with a cavity in its rear side, and is provided with a central upright spindle or bolt, c, arranged in said opening, and the scrapers or blades C' are hinged on said stud to swing outward laterally at their rear ends for the purpose of causing the machine to work a wider or narrower road.

The plow is suspended by means of a chain, J, from a roll, winding-drum, or windlass, K, mounted beneath the driver's seat, S, above the frame A, said chain being, in the present instance, linked to an eye, $C^2$, formed on the top end of the spindle c. The windlass or winding-drum is provided with a hand-wheel, K', and ratchet-wheel, L for operating it and retaining it at positions of adjustment, the hand-wheel being preferably arranged upon the end of the windlass-shaft at the outside of the seat, with its rim in convenient position to be grasped by the operator while sitting on the seat.

The pawl I, for engaging the ratchet-wheel L, is provided with a suitable spring, i, for retaining it in contact with the ratchet-teeth, and a treadle, M, is connected with said pawl, whereby it can be disengaged from the ratchet when desired by the operator placing his foot upon and depressing said treadle.

N indicates a bar having ratchet teeth, which bar is connected with the front of the plow at n' and extends up through the foot-board in the manner shown, and which serves for holding down the point of the plow when said ratchet-bar is latched onto the cross-piece or foot-board at n. Said bar is balanced so as to stand free from the catch n under normal conditions, but can be swung back into engagement as the operator may desire. The top end of said bar is provided with a handle, m, in reach of the operator, as indicated.

The lateral adjustment of the blades C' is effected and maintained by perforated or notched bars $C^3$, hinged or attached to the back of the blades at r, and passing through guides or slots connected with or formed in the push-frame D, and adjustably retained therein by pins which pass through holes in the bars, or, if preferred, by other equivalent fastening devices, whereby similar adjustment of the blades C' can be effected.

The front upper part of the plow is provided with a loop, O, to which a draft-chain, P, from the tongue T or team can be connected, for exerting draft directly upon the plow, in addition to that exerted through the frame A, when required.

The plow and scrapers can be given greater or less dip by depressing the point by means of the suspending-chain J and bar N, or by elevating the rear end by means of bar E, followers F, and screws G. The plow can be elevated in relation to the body by turning up on the screws G and simultaneously winding up on the chain J; or it may be lowered by reverse action of the chain and screws. The point and blades may be made to take an inclined position in relation to the body by turning up on one of the screws G and turning down on the other.

v indicates a foot-bar for the operator.

This machine is more especially designed for breaking out country roads through snow, but may be employed for grading and leveling, if desired, or for clearing stones and loose rubbish from the surface of the roads. The machine may, if desired, be made with a single adjustable blade, C'; or it may be worked with one blade extended and the other one drawn in, so as to plow principally toward one side.

I am aware that road-plows have heretofore been constructed in which the wings or scrapers were capable of lateral swinging adjustment; and I do not therefore claim novelty in the features of such adjustment.

What I claim as of my invention, and desire to secure by Letters Patent, is—

1. The combination, substantially as described, of the body or carrying-frame mounted on front and rear carrying wheels or runners, the plow having its point C adjustably suspended therefrom in a manner to permit lateral rocking action, the push-frame D, connected at its front end with said plow and having its rear end hinged to a transversely-disposed bar, the respective ends of which are independently vertically adjustable in relation to said carrying-frame, substantially as and for the purpose set forth.

2. The combination, with the carrying-frame mounted on wheels or runners, of a plow or scraper adjustably suspended therefrom, a push-frame in rear of said plow vertically adjustable at its rear end, which is sustained against backward thrust by brackets or braces fixed to said frame, and means for independently elevating and depressing the respective rear angles of said push-frame, substantially as set forth.

3. The combination, substantially as described, of the carrying-frame, the plow or blade adjustably suspended therefrom, the revoluble upright screw-shafts supported in connection with said frame and provided with hand cranks or wheels at their upper ends, the followers or nuts adapted to run up and down on said screw-shafts, a cross-bar connecting said followers, and the push frame or braces extending from said cross-bar to the plow, for the purposes set forth.

4. The combination, substantially as described, of the body or carrying-frame mounted on wheels or runners, the plow C, provided with laterally-adjustable scrapers or blades C', the triangular push-frame D, having its forward end fast to said plow and its rear ends hinged to the transverse bar E, lateral scraper-adjusting bars C³, guided upon and retained to said push-frame, supporting brackets or braces H, for sustaining the backward thrust of the plow and push-frame, and means for independently elevating and depressing the respective ends of said transverse bar, for the purposes set forth.

5. In a road-working machine, the combination, substantially as described, with the carrying-frame mounted on traveling wheels, and the push-frame which sustains the backward thrust of the plow, of upright screw-shafts G, follower-nuts F, having projections or studs $f$, and the transverse hinging-bar E, provided with slots $f'$, for receiving the follower-studs and permitting diagonal adjustment, as set forth.

6. The plow-point C, having a cavity in its rear side and provided with a centrally-disposed spindle, $c$, with the laterally-adjustable scraper-blades C', hinged at their front ends upon said central spindle, the triangular push-frame D, attached to said point, and laterally-adjusting brace-bars C³, for sustaining said scraper-blades more or less distant from the sides of said push-frame, combined with a carriage or body mounted on traveling wheels or runners and provided with means for suspending and adjusting said plow in relation thereto, substantially as set forth.

7. The combination, substantially as described, with the carrying-frame A, the plow C C', the push-frame D, and its rear end supporting and adjusting mechanism, of the plow-point suspending-chain J, and the winding-drum K, hand-wheel K', ratchet L, and pawl I, mounted above said carrying-frame, for the purpose set forth.

8. The seat S, having the winding-drum K and its stop-ratchet L rotatively supported thereunder, the hand-wheel K', disposed on the end of the winding-drum shaft at the side of the seat, and the pawl or stop I, combined with the wheeled carrying-frame and suspended point of the plow or scrapers, as set forth.

9. The combination, with the carrying-frame, the plow, its suspending-chain, and the chain-winding mechanism and ratchet mounted beneath the driver's seat, of the pawl or stop catch having a foot-treadle connected therewith for disengaging it from the ratchet to release the winding-drum, substantially as herein set forth.

10. The combination, with the carrying-frame A and plow-point C, of the lifting-chain J and mechanism for winding up and holding the same, and the depressing-bar N, having a series of ratchets or notches for engagement with the foot-board or catch-plate, substantially as and for the purpose set forth.

11. The combination, with the plow, the push-frame D, and bar E, of the brace D', the loop O, and draft-chain P, substantially as and for the purpose set forth.

Witness my hand this 22d day of June, A. D. 1886.

JASPER FAY.

Witnesses:
S. M. GRIGGS,
HENRY L. CHASE.